United States Patent [19]

Plantan

[11] Patent Number: 5,331,929
[45] Date of Patent: Jul. 26, 1994

[54] CYLINDER HEAD FOR INTERNAL COMBUSTION ENGINE AND A PROCESS OF OPERATING SAME

[75] Inventor: Ronald S. Plantan, 10315 Thomas Payne Cir., Charlotte, N.C. 28277

[73] Assignees: Ronald S. Plantan; Gregory N. Clements; Dewayne Demus, all of Charlotte, N.C. ; a part interest

[21] Appl. No.: 777,654

[22] Filed: Oct. 16, 1991

[51] Int. Cl.⁵ .............................................. F01L 1/28
[52] U.S. Cl. ................................. 123/79 R; 123/65 V
[58] Field of Search .................. 123/79 R, 65 V, 73 V

[56] References Cited

U.S. PATENT DOCUMENTS

| | | | |
|---|---|---|---|
| 1,397,585 | 11/1921 | James | 123/79 R |
| 2,127,692 | 8/1938 | Lothrop | 123/79 R |
| 2,215,579 | 9/1940 | Eichelberg | 123/79 R |
| 2,742,028 | 4/1956 | Robinson | 123/79 R |
| 3,097,633 | 7/1963 | Klein | 123/79 R |
| 4,075,986 | 2/1978 | Keck | 123/79 R |
| 4,273,083 | 6/1981 | Moiroux | 123/79 R |
| 4,372,259 | 2/1983 | Vosper | 123/79 R |
| 4,487,171 | 12/1984 | Vosper | 123/79 R |
| 5,143,027 | 9/1992 | Bergeron | 123/65 V |

FOREIGN PATENT DOCUMENTS

| | | | |
|---|---|---|---|
| 0126013 | 7/1984 | Japan | 123/79 R |
| 0153907 | 9/1984 | Japan | 123/79 R |
| 128943 | 4/1921 | United Kingdom | 123/79 R |

*Primary Examiner*—David A. Okonsky
*Attorney, Agent, or Firm*—Gregory N. Clements

[57] ABSTRACT

A cylinder head for an internal combustion engine of either a two-cycle operation or a four-cycle operation is disclosed. The cylinder head includes an intake port, an exhaust port, a dual-function chamber, a poppet valve positioned within the dual-function chamber, and a flapper valve also positioned within the dual-function chamber, capable of sealing the intake port from the dual-function chamber, capable of sealing the exhaust port from the dual-function chamber. If the cylinder head is for a two-cycle engine, an injector may be positioned within the cylinder head so that fuel is injected either within the dual-function chamber, or directly injected within the combustion chamber. A process of operating the cylinder head in conjunction with an internal combustion engine is also disclosed.

16 Claims, 14 Drawing Sheets

CYLINDER HEAD FOR INTERNAL COMBUSTION ENGINE AND A PROCESS OF OPERATING SAME

BACKGROUND OF THE INVENTION

1. Field Of The Invention

The present invention relates to a cylinder head for an internal combustion engine. In particular, the cylinder head of the present invention has one valve per cylinder for both the intake and exhaust functions of either a two-cycle or a four-cycle engine. More particularly, the cylinder head of the present invention employs a poppet valve in communication with the combustion chamber and is designed to exceed the air flow capability (outflow) of conventional two, three, and four valve per cylinder. Because the power of an engine is proportional to the air flow capacity, the cylinder head of the present invention yields an increase in power over conventional cylinder heads.

The present invention also discloses a process of operating the cylinder head in conjunction with an internal engine.

2. Prior Art

Fuel efficiency requirements by the United States and other governments throughout the world become increasingly more difficult to attain. Fuel efficiency dictates lighter weight cars and smaller engines compared with engines produced as little as ten years ago. To obtain increased power from the smaller engines, manufacturers are abandoning typical two-valve per cylinder engines (an exhaust valve and an intake valve) and instead manufacturing engines having multivalves, such as two intake valves and one exhaust valve, or two intake valves and two exhaust valves. Such multivalve engines are designed to increase the flow of the fuel air mixture into the combustion chamber to achieve the increased power from each cylinder of the engine.

Various problems arise, however, in the use of multivalve engines. First, design considerations become much harder to achieve because two intake valves and two exhaust valves must now be designed and operated in a space (the top of the combustion chamber) which traditionally only held one intake valve and one exhaust valve. Moreover, controlling each of these valves in synchronization, or independently, requires several times more moveable components, thereby increasing manufacturing cost and potential maintenance and repair costs.

Second, cramming multivalves into a combustion chamber decreases the efficiency of each valve because the size of each valve is reduced and the effective curtain area (the area of air flow around each valve) is reduced because flow from one valve interferes with the flow from another valve, and because space limitations require that the valves be positioned close to the combustion chamber side walls, thus further reducing the effective curtain area of the valves.

Third, multivalve engines are not clean, compared with two-valves r cylinder engines, and therefore carry an emissions debit such as higher hydrocarbons, carbon monoxides, and oxides of nitrogen. It has been reported that the emissions debit of multivalve engines, depending on the size of the engines, is anywhere from 25 to 40 percent higher in hydrocarbons. Thus, increasing the flow to achieve more power by employing multivalve engines provides a whole host of other problems which must be overcome while simultaneously meeting increased fuel efficiency requirements.

One potential solution to this problem is to employ a rotary valve positioned atop the combustion chamber, which at one point of the rotation of the valve, the intake of a fuel air mixture into the combustion chamber occurs, while at another location of the rotary valve, the exhaust gases are permitted to exit the combustion chamber. A single rotary valve per cylinder design has been known for many years and suffers many problems which to this day have not been overcome. Chiefly among those problems is the inability to adequately seal around the rotary valve to prevent oil leakage, fuel air mixture leakage, and exhaust gases leakage.

Another solution is proposed by U.S. Pat. No. 3,097,633 to Klein. This patent employs a single poppet valve in the cylinder chamber and a curved deflector gate to oscillate between an intake conduit and an exhaust conduit. It is believed that this combustion head design suffers several defects making the design impractical for today's internal combustion engine requirements. First, there is an increase in emissions due to fuel trapped under the curved deflector gate as it oscillates between the open and closed positions where unburned hydrocarbons are exhausted from the combustion chamber. Secondly, it is believed that a pulsating motion which negatively affects flow efficiency is set up in the intake conduit, particularly at high speeds, because the curved deflector gate opens into, and therefore counter-directional to, the flow of the fuel air mixture. Thirdly, during the exhaust cycle, the rush of exhaust gases tends to deflect the curved deflector toward the intake position, thereby tending to force exhaust gases into the intake passage. Fourthly, the bight side of the curved deflector is exposed to both the fuel mixture and the exhaust gases. Any carbon deposits on the bight side could cause undesirable pre-ignition and/or dieseling by virtue of the fuel/air mixture contacting the hot carbon deposits. Fifthly, as the engine heats up, the deflector gate, which is in contact with the exhaust gases, also heats up. The expansion of the deflector gate enlarges the slot, and sealing becomes difficult to achieve which may permit the escape of unburned hydrocarbons.

There continues to be a need for an improved cylinder head design to possess flow characteristics equal to or exceeding that of multivalve engines, while simultaneously improving the emissions debit. The present invention, it is believed, meets not only these criteria, but also possesses other characteristics manufacturers of internal combustion engines desire.

SUMMARY OF THE INVENTION

The cylinder head of the present invention is operable on both a two-cycle engine and a four-cycle engine. However, the operation of the cylinder head differs, as will be fully explained later, depending on whether it is mounted on a two-cycle or four-cycle engine. The broadest form of the invention comprises a cylinder head for an internal combustion engine, wherein the cylinder head has a dual-function chamber in communication with the combustion chamber. Both the intake passage and the exhaust passage are also in communication with the dual-function chamber. A first valve is positioned where the dual-function chamber meets the combustion chamber, as is generally known in the art. A second valve is positioned within the dual-function chamber for controlling the flow of the fuel mixture into the dual-function chamber and for controlling the flow of exhaust gases away from or out of the dual-function chamber. The second valve is designed so that when exhaust gases are flowing from the dual-function chamber to the exhaust passage, the exhaust gases push against the second-valve, causing an increased closing force, sealing the intake passage thoroughly from the dual-function chamber.

The broadest form of the invention also comprises a cylinder head for an internal combustion engine, wherein the cylinder head has a dual-function chamber in communication with the combustion chamber. Both the intake passage and the exhaust passage are also in communication with the dual-function chamber. A first valve is positioned where the dual-function chamber meets the combustion chamber, as is generally known in the art. A second valve is positioned within the dual-function chamber for controlling the flow of the fuel mixture into the dual-function chamber and for controlling the flow of exhaust gases away from or out of the dual-function chamber. The second valve is designed as a plate type valve (flapper valve) wherein one side is only in communication with the fuel/air mixture, while the other side is only in communication with the exhaust gases, thereby preventing any pre-ignition of the fuel-air mixture as it flows into the dual-function chamber.

The broadest form of the present invention also comprises operating the cylinder head in conjunction with an internal combustion engine. The operational process includes the steps of intake of fuel and air, compression of the fuel and air, burning the compressed fuel and air in a power stroke, and exhausting said burnt gasses.

BRIEF DESCRIPTION OF THE DRAWINGS

The figures of the drawings further explain and aid in the understanding of the invention. However, the figures of the drawings are not meant to limit the scope of the present invention beyond the limits of the claims.

DESCRIPTION OF THE PREFERRED EMBODIMENTS

Figure 1:
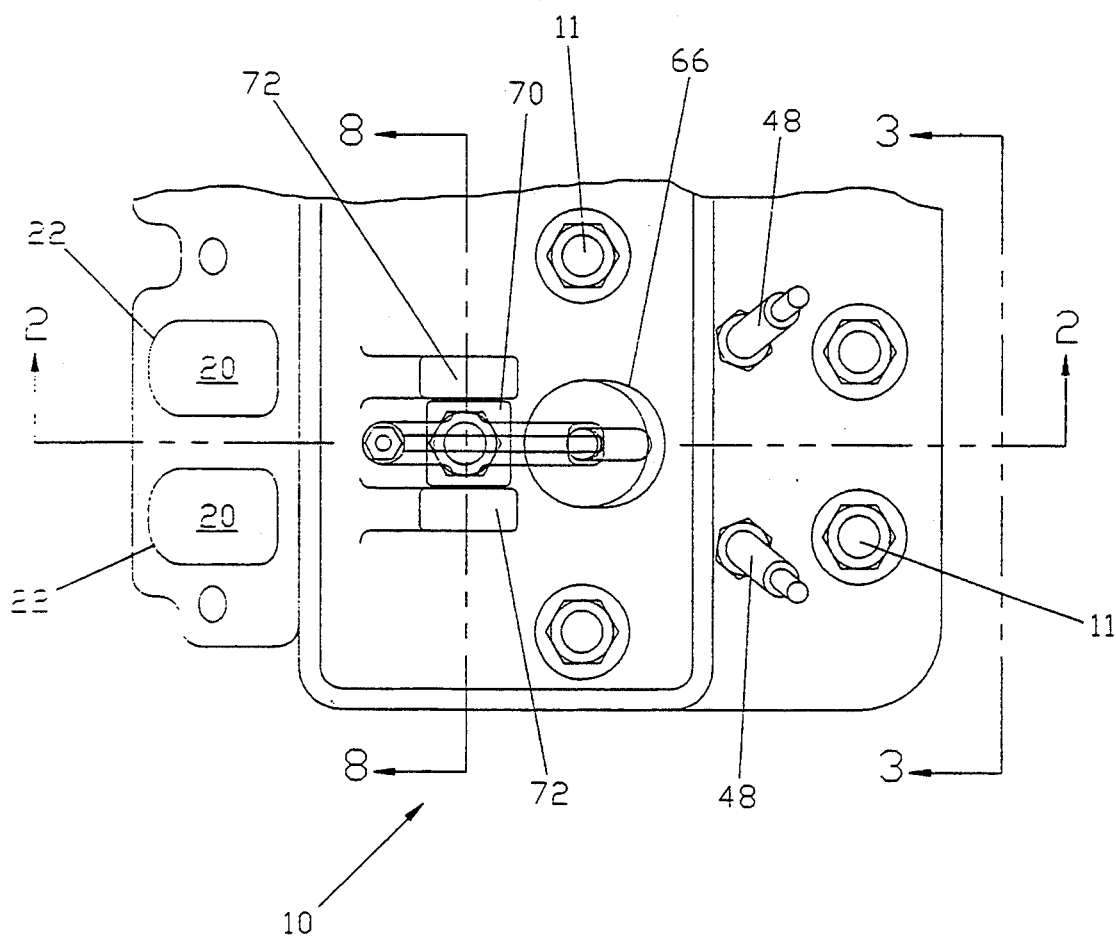
FIG. 1 is a partial top view of a cylinder head designed to operate with a single combustion chamber.
Figure 2:
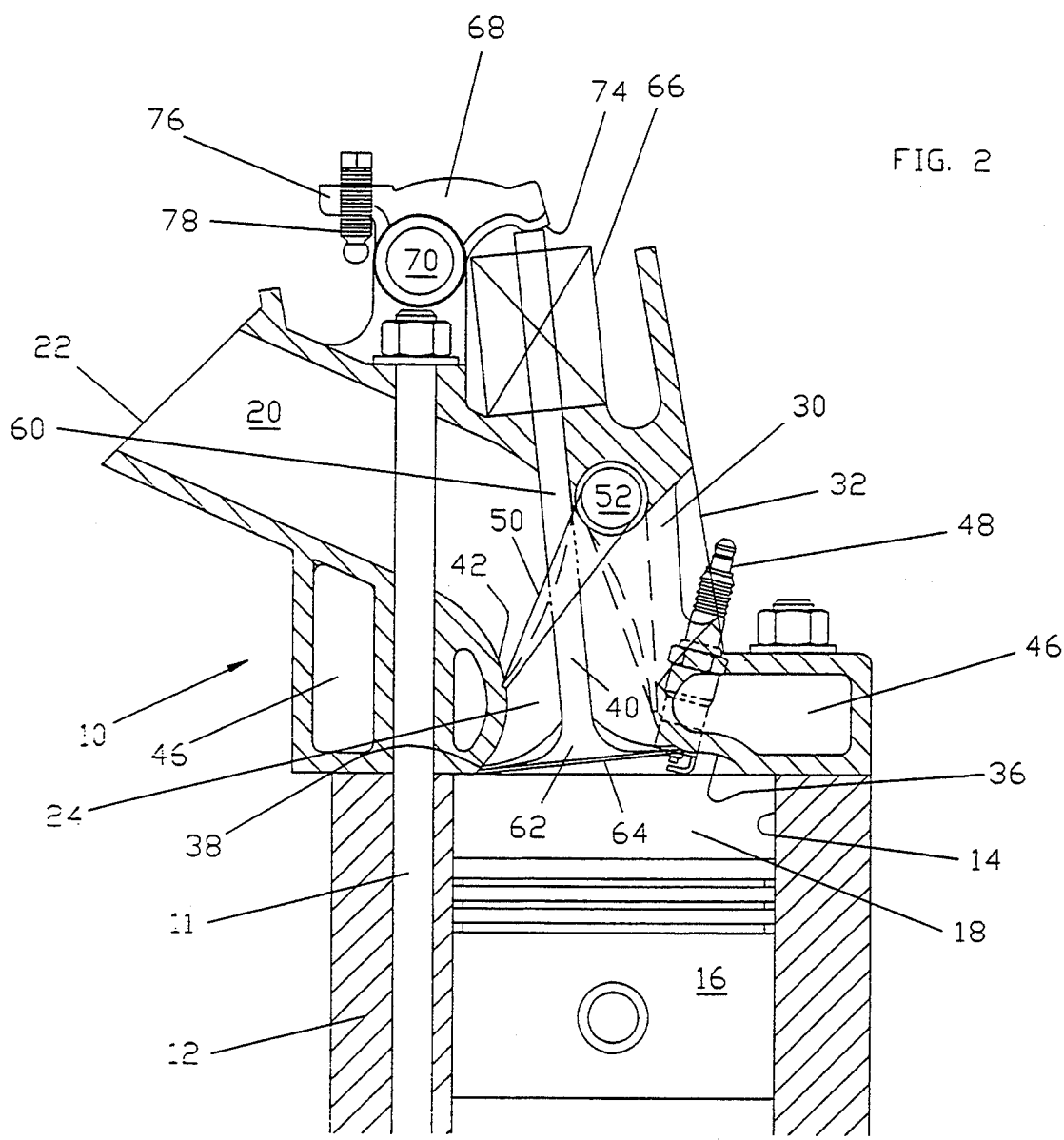
FIG. 2 is a cross-sectional side view along line 2—2 of FIG. 1.
Figure 3:
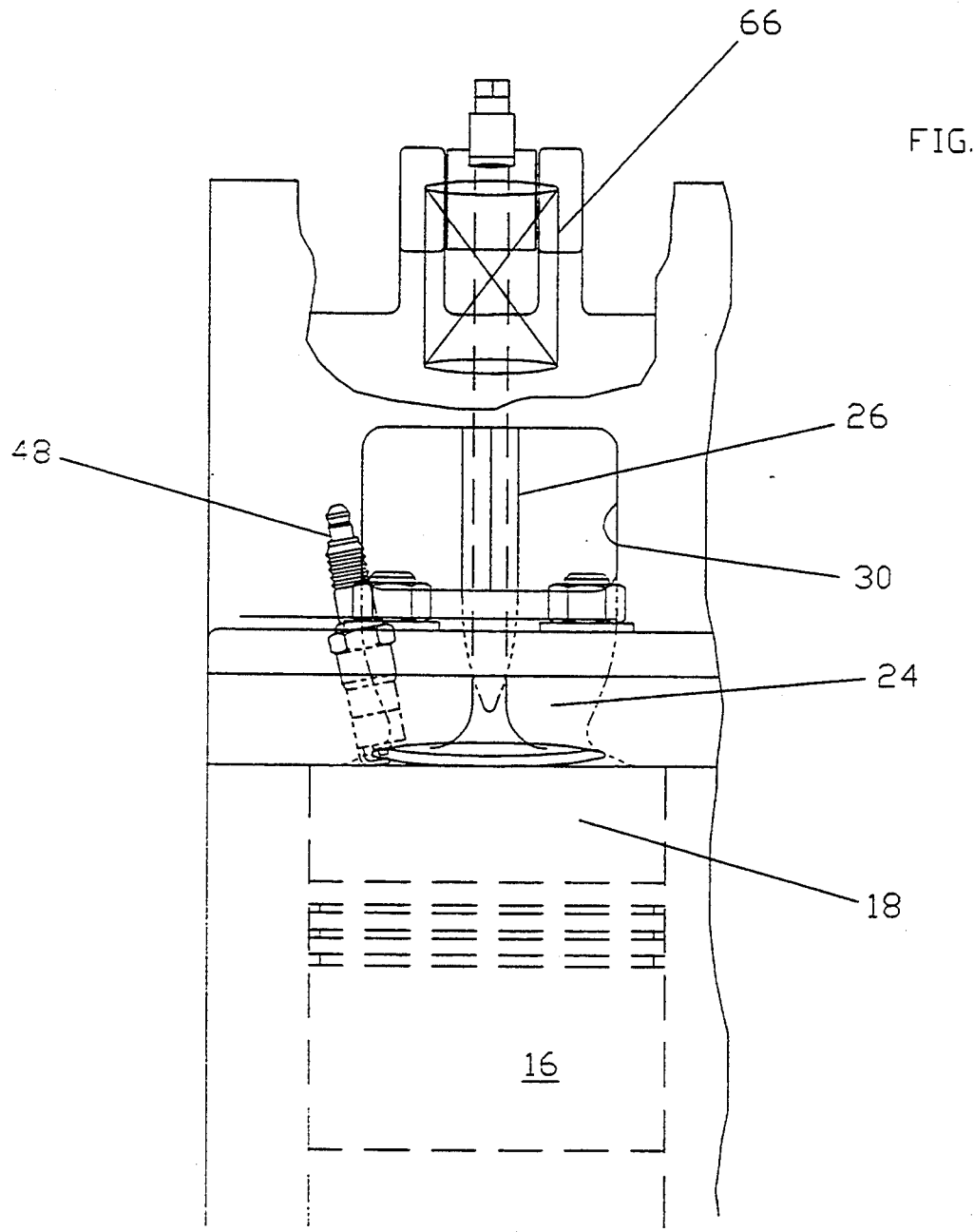
FIG. 3 is a partial side view along line 3—3 of FIG. 1 omitting the second spark plug.

As shown in FIGS. 1-3, a cylinder head generally represented by reference numeral 10 may be made from metal, such as aluminum, iron, or steel; or from ceramic such as metal oxide like aluminum oxide, or other suitable material generally known in the art. The cylinder head 10 is mounted on the block 12 of an internal combustion engine and secured by means of multiple bolts/nuts 11. The block 12 contains one or more cylinders 14, each of which contain a piston 16. Each piston 16 is movably coupled with a crank shaft (not shown) as is known in the art, and is designed to reciprocate toward and away from the cylinder head 10. A combustion chamber 18 is formed by the wall of cylinder 14, the top of piston 16 and the cylinder head 10.

The cylinder head has at least one intake port 20 (dual intake ports are shown particularly in FIGS. 1 and 3). Referring to FIG. 2, each intake port 20 is adopted to be coupled with an intake manifold or air injection means (not shown) at its opening 22 for receiving a fuel/air mixture, as is conventionally known in the art. If the fuel for the engine is port injected (fuel injected at a location prior to flow into the combustion chamber), or is directly injected (fuel injected directly into the combustion chamber), the intake port 20 is employed to transport air. The intake port 20 integrally extends into a dual function chamber 24. Where it is desired to have dual intake ports for each combustion chamber 18, as shown specifically in FIGS. 1, 3 and 8, a system wall 26 separates the dual intake ports 20 and both intake ports terminate into a single dual function chamber 24.

The cylinder head 10 has an exhaust port 30 whose outer end 32 is adopted to be coupled with an exhaust manifold (not shown) as is conventional in the art. The exhaust port 30 also integrally extends from the dual function chamber 24, as shown in FIG. 2.

As shown in FIG. 2, the dual function chamber 24 typically has a flared portion 36 gradually extending into the combustion chamber 18. Near the junction of the flared portion 36 and the combustion chamber 18 is a valve seat 38 for poppet valve 40. Near the junction of the flared portion 36 and both the intake and exhaust ports (20 and 30, respectively) is valve seat 42 for a plate-like flapper valve 50. For a two-cycle engine, it may only be necessary for the valve seat 42 be located on and around the intake port 20, unless the two-cycle engine is supercharged, as explained later. For a four-cycle engine, the valve seat 42 for the flapper valve 50 extends around both the intake port 20 and the exhaust port 30.

Figure 9:
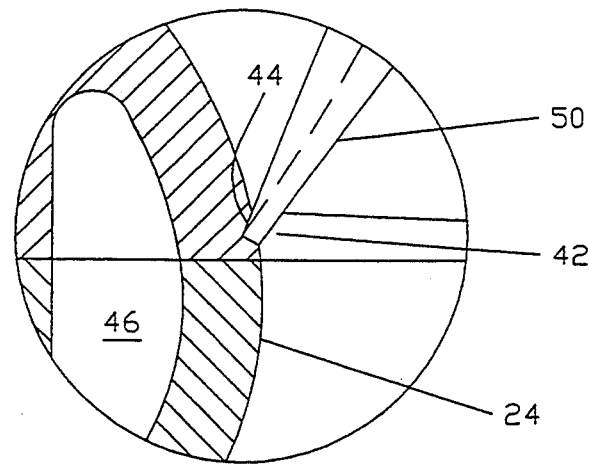
FIG. 9 is a partial enlarged view of the plate valve and the valve seat.

As illustrated in the enlarged view of FIG. 9, the valve seat 42 is formed by a recess 44 within the walls of the dual-function chamber 24. Surrounding the dual-function chamber 24 is one or more conventional water plenums 46 for controlling the temperature of the cylinder head 10, as is known in the art. The cylinder head 10 may also be employed with air-cooled engines, wherein the plenums 46 may be used to circulate air, or be replaced with conventional cooling fins as is known in the art for air-cooled engines.

As shown in FIGS. 1-3, one or more spark plugs 48 is threadably mounted in cylinder head 10 so that the igniter end communicates with combustion chamber 18 as is conventionally known.

The poppet valve 40, as shown in FIGS. 1-3, is conventional in the art and includes a valve stem 60 and a base plate 62. The outer edge of the base plate 62 includes a beveled surface 64 designed to perfectly mate with valve seat 38 to seal the fuel-air mixture (or air if the fuel is directly injected) and exhaust gas when desired. The poppet valve 40 is designed to reciprocate away from and toward the valve seat 38 (into and out of the combustion chamber), as known in the art.

Although the reciprocation mechanism for poppet valve 40 may consist of any one of many different technologies, such a computer controlled electronic actuation, or mechanically controlled by spring biasing/push rod, the present invention is not limited to any specific mechanism. For purposes of explaining the invention, a typical spring biased/push rod reciprocating mechanism is illustrated and disclosed. A spring 66 is compressed between the cylinder head 10 and a conventional spring retainer (not shown) which is secured to the valve stem 60. In this manner, spring 66 normally biases the poppet valve 40 so that beveled surface 64 mates with and rests against valve seat 38. A rocker arm 68 is pivotably mounted on shaft 70 which is secured by multiple shaft supports 72 as illustrated in FIG. 1. The rocker arm 68 includes a cam surface portion 74 designed to contact the end of valve stem 60 as shown in FIG. 2. An opposed portion 76 of rocker arm 68 is coupled with a push rod 8, which in turn is conventionally controlled by a cam (not shown) causing push rod 78 to reciprocate along its linear axis. Reciprocation of the push rod 78 causes the rocker arm 68 to rock back and forth, thus reciprocating poppet valve 40 against the pressure of spring 66 (compare FIG. 2 with FIG. 4).

Figure 5:
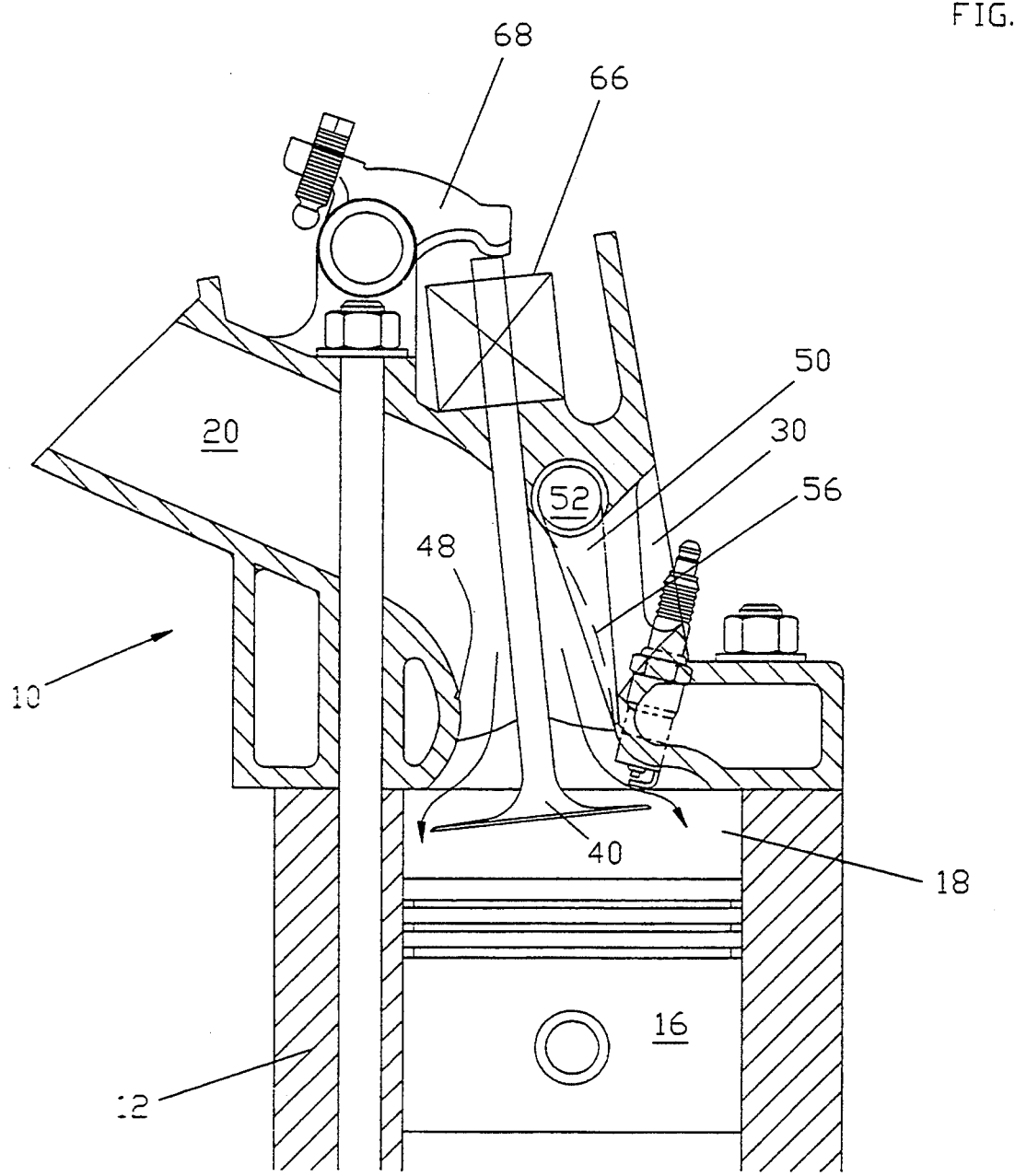
FIG. 5 is a cross-sectional side view similar to FIG. 2, but illustrating the initial stage of the intake phase.
Figure 7:
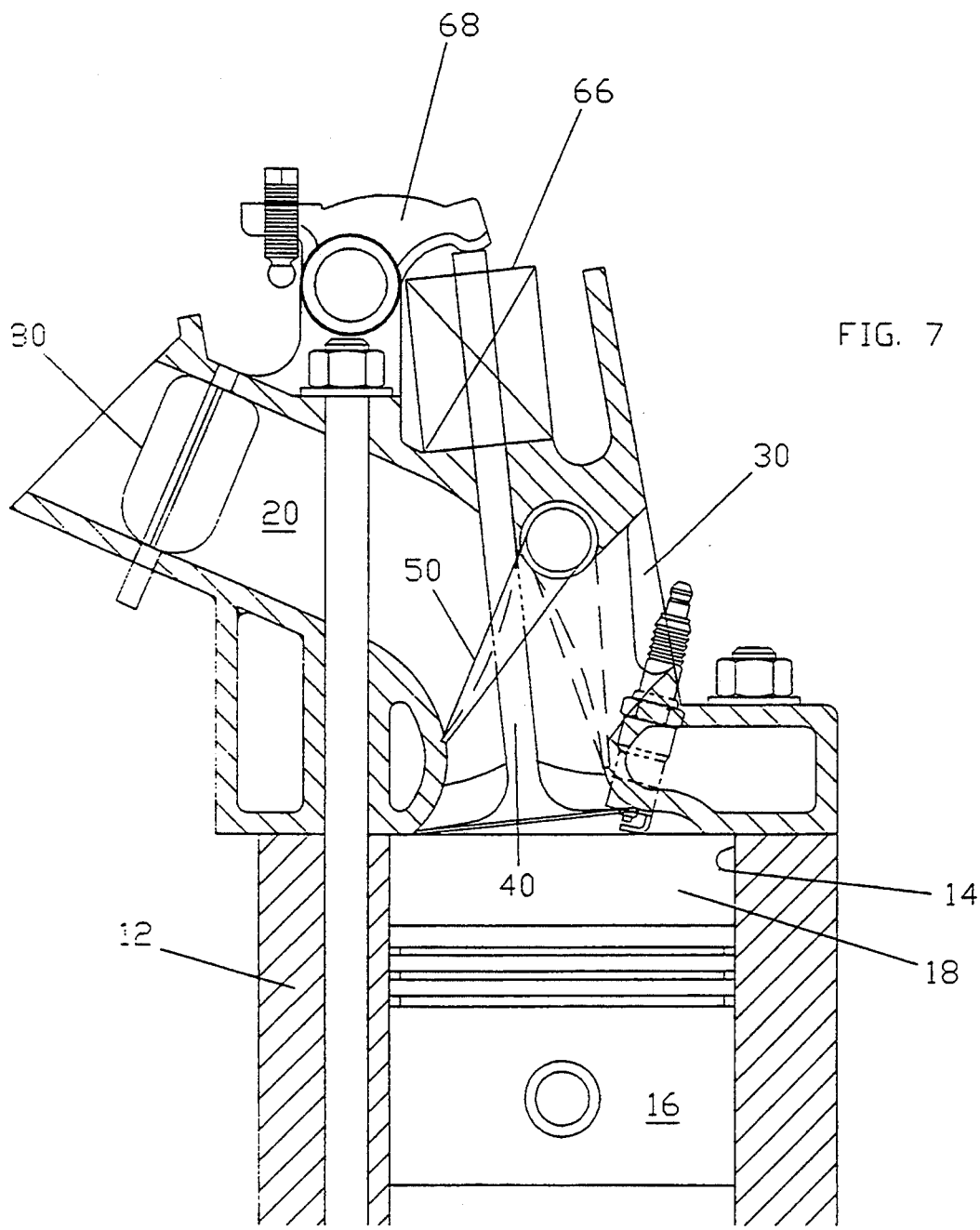
FIG. 7 is a cross-sectional side view similar to FIG. 2, but illustrating an optional embodiment.
Figure 10:
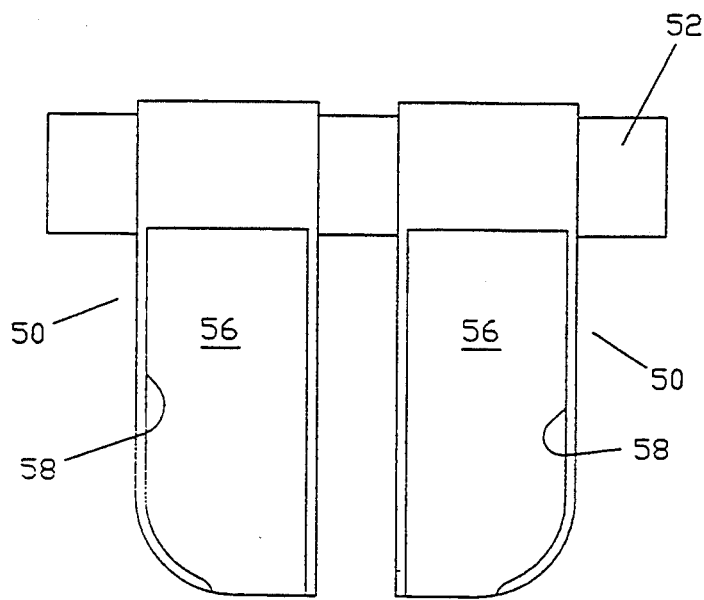
FIG. 10 is a frontal view of dual plate valves mounted on a shaft.
Figure 11:
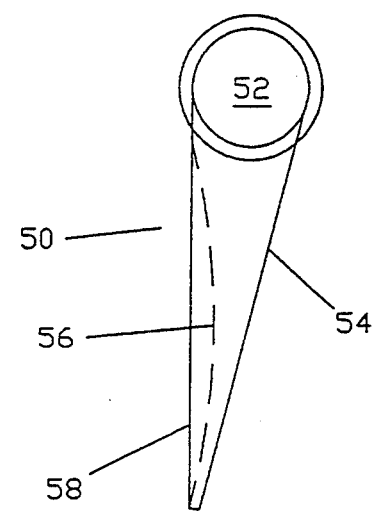
FIG. 11 is a side view of a plate valve mounted on a shaft.

The plate-like flapper valve 50 may consist of two flapper valves when dual intake ports are employed, as illustrated in FIG. 10. The flapper valve 50 is secured to a valve shaft 52 by any conventional means. As shown in FIGS. 10 and 11, the flapper valve 50 has an exhaust side 54 which communicates with the exhaust port 30, and an arcuate side 56 which communicates with the intake port 20. The arcuate side 56, as shown in FIG. 5, gradually transitions the fuel/air mixture (or the air in direct injection engines) from the intake port 20 to the dual-function chamber 24. At a high rate of flow for the fuel/air mixture, the arcuate side 56 tends to create a smooth flow from the intake port to the dual-function chamber, thereby achieving more complete filling of the combustion chamber 18. At a low rate of flow, a swirling effect into the combustion chamber is desired. When dual intake ports are employed, as shown in FIGS. 1 and 7, a swirling effect can be achieved by utilizing a rotatable flat valve 80 in one of the intake ports 20, as shown in FIG. 7. When the valve 80 is closed, it seals one of the two intake ports 20, and at low fuel/air flow, the mixture enters the dual-function chamber 24 from one side, and as the mixture flows across the entire dual-function chamber 24 it swirls to achieve better mixing of the fuel and air.

The flapper valve 50 includes an edge portion 58 around its periphery as shown in FIGS. 10 and 11. When the flapper valve 50 is fully seated in either the intake position (FIG. 5), or the exhaust position (FIG. 4), the edge portion is not generally exposed to the intake port 20 or the exhaust port 30 (see FIG. 11). Only when the flapper valve has moved away from the seat 48 are the edge portions 58 exposed. This permits the flapper valve to open very quickly when compared to more conventional non-recessed valve seats. This is because the flapper valve has achieved some acceleration internally without permitting any flow of the fuel/air mixture.

Figure 4:
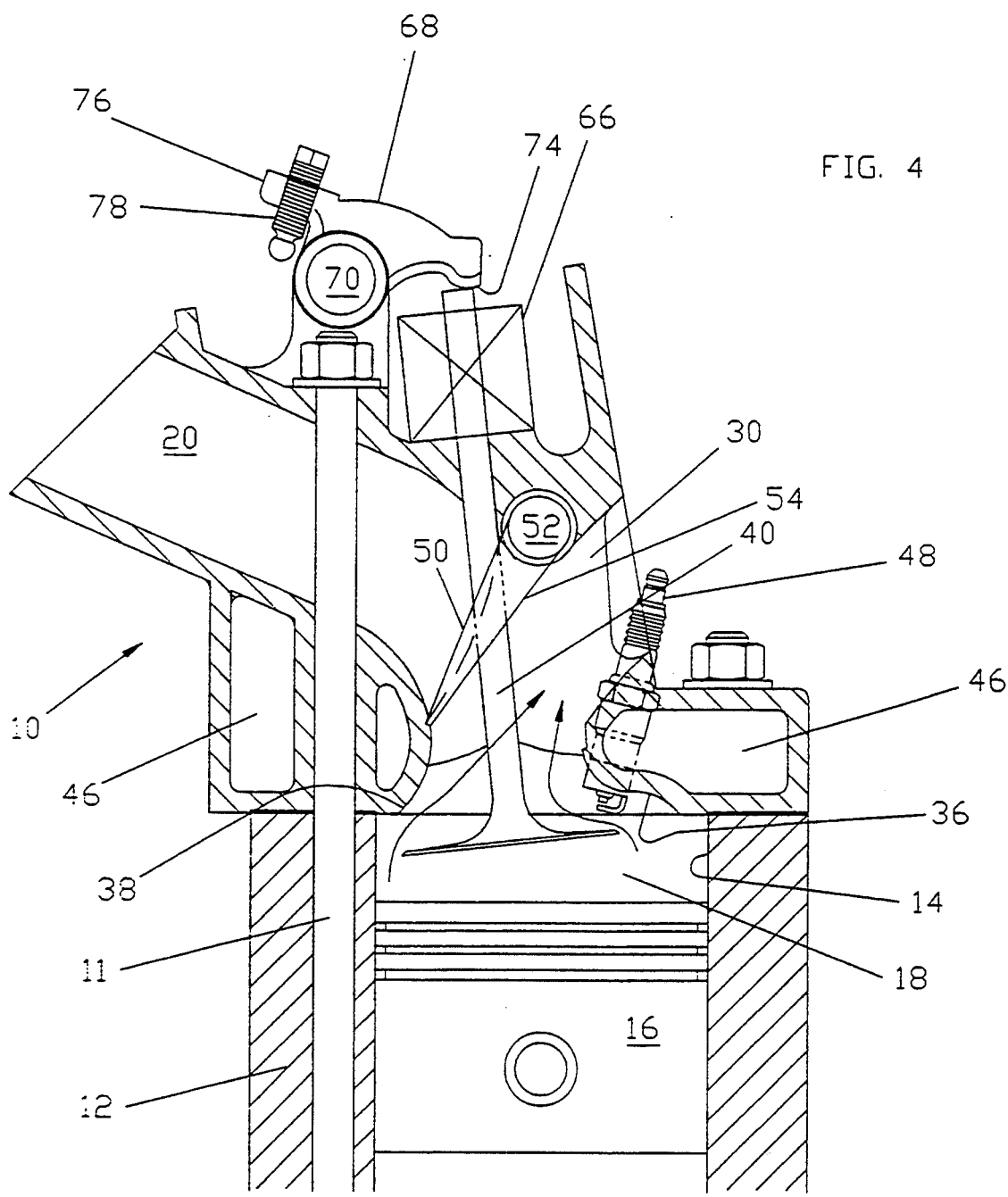
FIG. 4 is a cross-sectional side view similar to FIG. 2, but illustrating completion of the exhaust phase.
Figure 6:
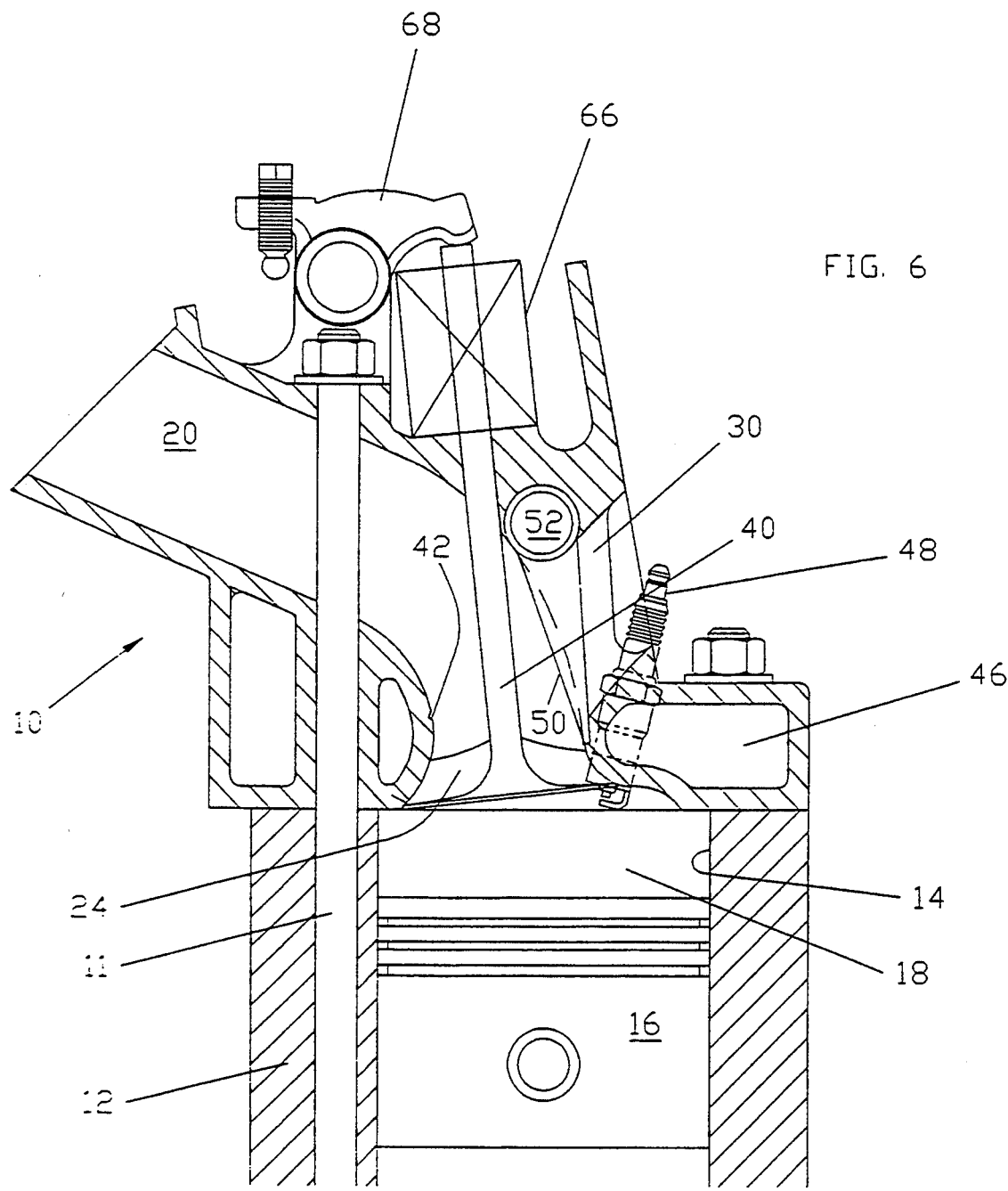
FIG. 6 is a cross-sectional side view similar to FIG. 2, illustrating the compression phase.
Figure 12:
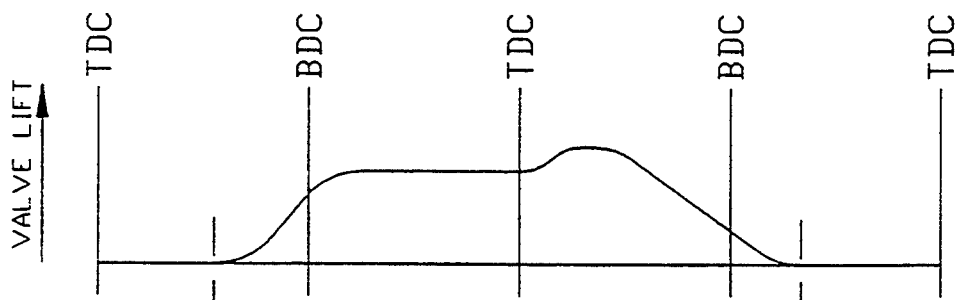
FIG. 12 is a graph showing the position of the poppet valve during the four-cycle operation of an internal combustion engine.
Figure 13:
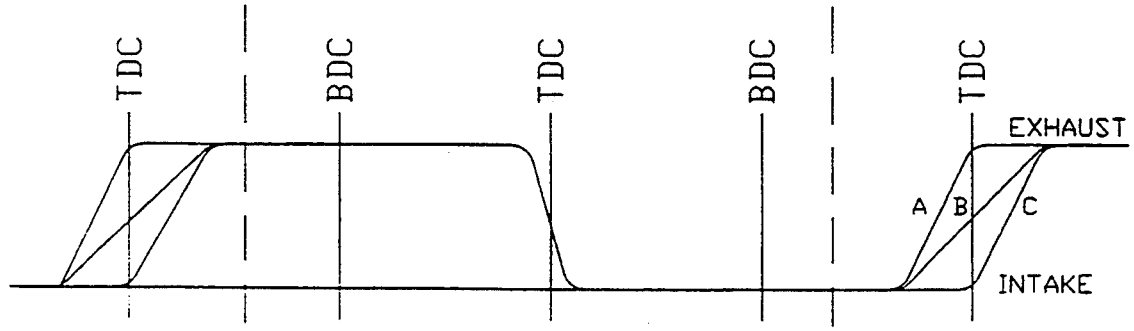
FIG. 13 is a graph showing the position of the flapper valve during the four-cycle operation of an internal combustion engine.

In the operation of a four-cycle internal combustion engine of the present invention having a single intake port, flapper valve 50 is adjacent the exhaust port 30, the poppet valve 40 is open (spaced away from valve seat 38) and the piston 16 is near the top of its stroke, all as illustrated in FIG. 5. FIG. 13 graphically shows the position of the flapper valve 50 and FIG. 12 shows position of the poppet valve 40 during operation. As the piston 16 starts its downward stroke, it draws the fuel/air mixture (or air if direct injection of fuel is contemplated) from the intake manifold (not shown) into the intake port 20, past the flapper valve 50, into the dual-function chamber 24, around the poppet valve 40 and into the combustion chamber 18 (again, see FIG. 5). Once the piston 16 reaches approximately the bottom of its stroke (bottom dead center =BDC), the poppet valve 40 closes and the piston starts its upward stroke "compressing" the fuel/air mixture, as shown in FIG. 6 and graphically illustrated in FIGS. 12 and 13. When the piston 16 again reaches approximately the top of its stroke (top dead center=TDC), the spark plug 48 fires and the spark ignites the mixture. As the mixture burns it expands, "powering" the piston downwardly. During the "compression" stroke and the "power" stroke the flapper valve 50 can remain adjacent the exhaust port 30 (position C in FIG. 13), or it can gradually be moved adjacent the intake port 20 (position B in FIG. 13), or rapidly moved to the intake port (position A in FIG. 13) during rapid acceleration. Once the piston 16 reaches approximately the bottom of the power stroke, the flapper valve 50 must be moved adjacent the intake port 20, if it has not been earlier moved, and the poppet valve opens, as shown in FIG. 4. As the piston 16 starts its upward stroke, it pushes the burnt exhaust gasses out of the combustion chamber 18, around the poppet valve 40, into the dual-function chamber 24, past the exhaust face 54 of flapper valve 50, and out through the exhaust port 30, as shown in FIG. 4. When the piston 16 again reaches approximately its top position, the flapper valve 50 flips to a position adjacent the exhaust port 30, thus sweeping out the remainder of the exhaust gasses from the dual-function chamber 24, as graphically illustrated in FIG. 13. Since the poppet valve 40 is already open, the fuel/air mixture (or air in direct injection engines) is once again drawn into the combustion chamber as previously described with respect to FIG. 5.

The four-cycle operation of the dual intake port cylinder head of the present invention, as shown in FIG. 1, could be identical to that described for the single intake port cylinder head. However, if one of the intake ports includes valve 80 as shown in FIG. 7, the operation of the dual intake ports can yield additional benefits.

At low fuel/air mixture velocities (or air velocities where fuel injection is employed) through intake port 20, swirling the fuel and air mixture within the combustion chamber 18 for good uniform mixing is desirable. To achieve this, one of the dual intake ports can be disabled (shut-off) by closing valve 80 such that there is virtually no flow through that intake port. The remaining intake port provides sufficient flow to properly operate the engine.

Figure 8:
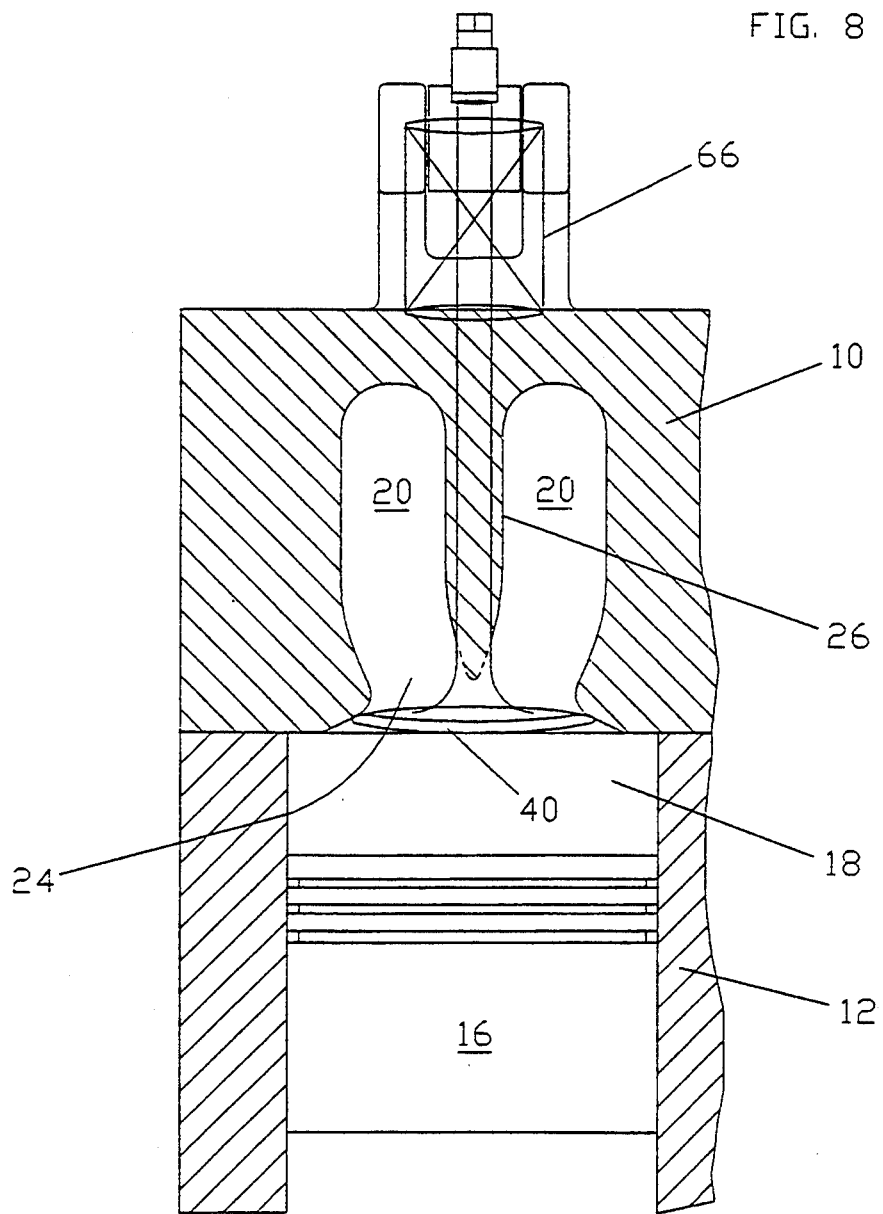
FIG. 8 is a partial cross-sectional view along line 8—8 of FIG. 1.

Because the remaining intake port opens directly over about half of the poppet valve 40, as partially shown in FIG. 8, the fuel/air mixture (or air) swirls across the dual-function chamber 24 and into the combustion chamber 18. The resulting good mixing yields improved efficiencies at low velocities (generally low vehicular speed).

At high velocities, swirling is not desirable because it reduces air flow efficiency and thus cylinder filling efficiency is reduced. At high velocities it is desirable to ram the fuel-air mixture (or air) into the combustion chamber 18 as quickly as possible. This is achieved by operating both intake ports 20, that is, valve 80 must be in the open position. No swirling is possible because all portions of the combustion chamber are fed by both intake ports. In summary, dual intake ports can be operated to provide variable swirling.

Figure 14:
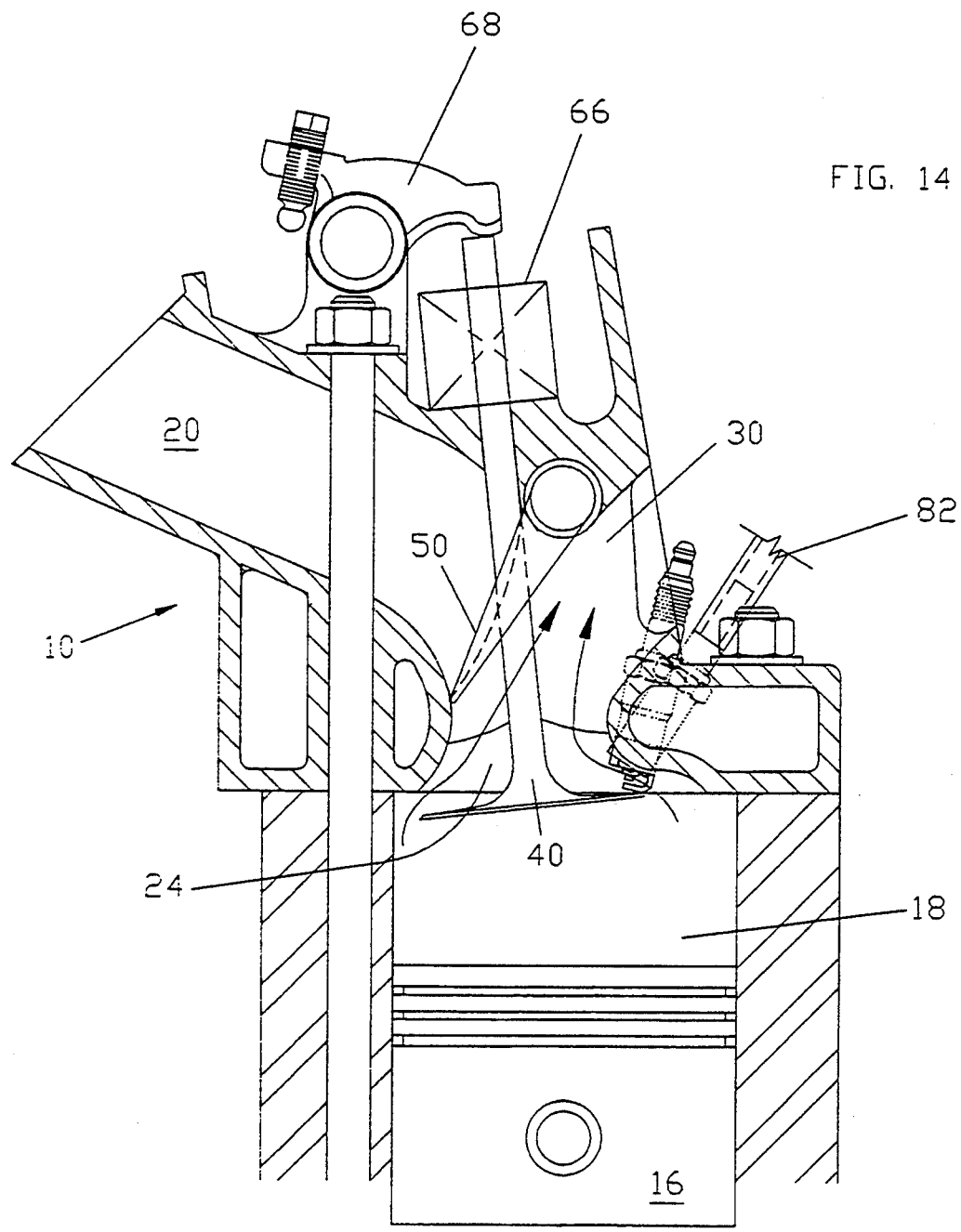
FIG. 14 is an enlarged cross-sectional side view of a two-cycle engine with the flapper valve located in the exhaust position.
Figure 15:
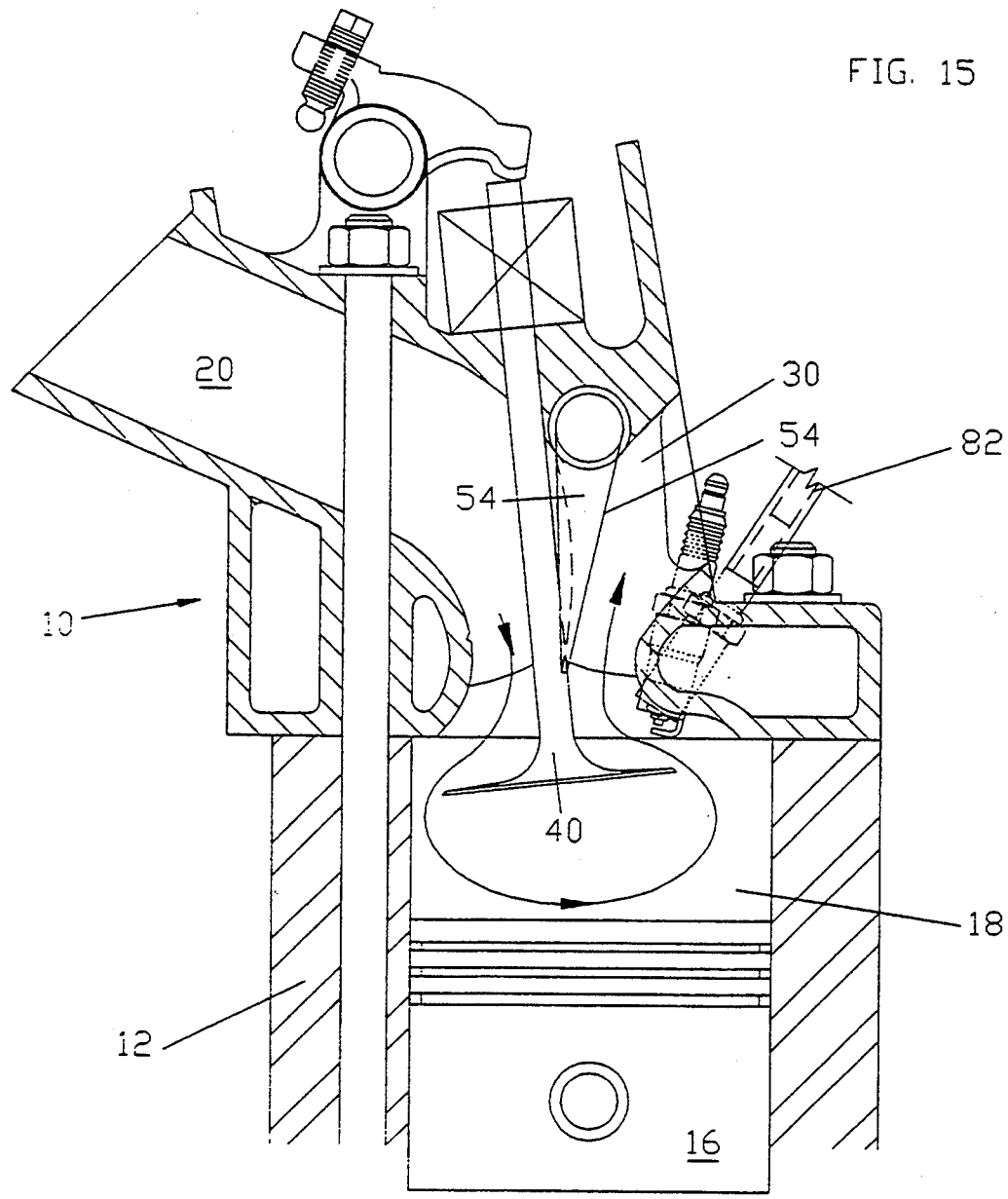
FIG. 15 is a cross-sectional side view of a two-cycle engine with the flapper valve located in the scavenging position.
Figure 16:
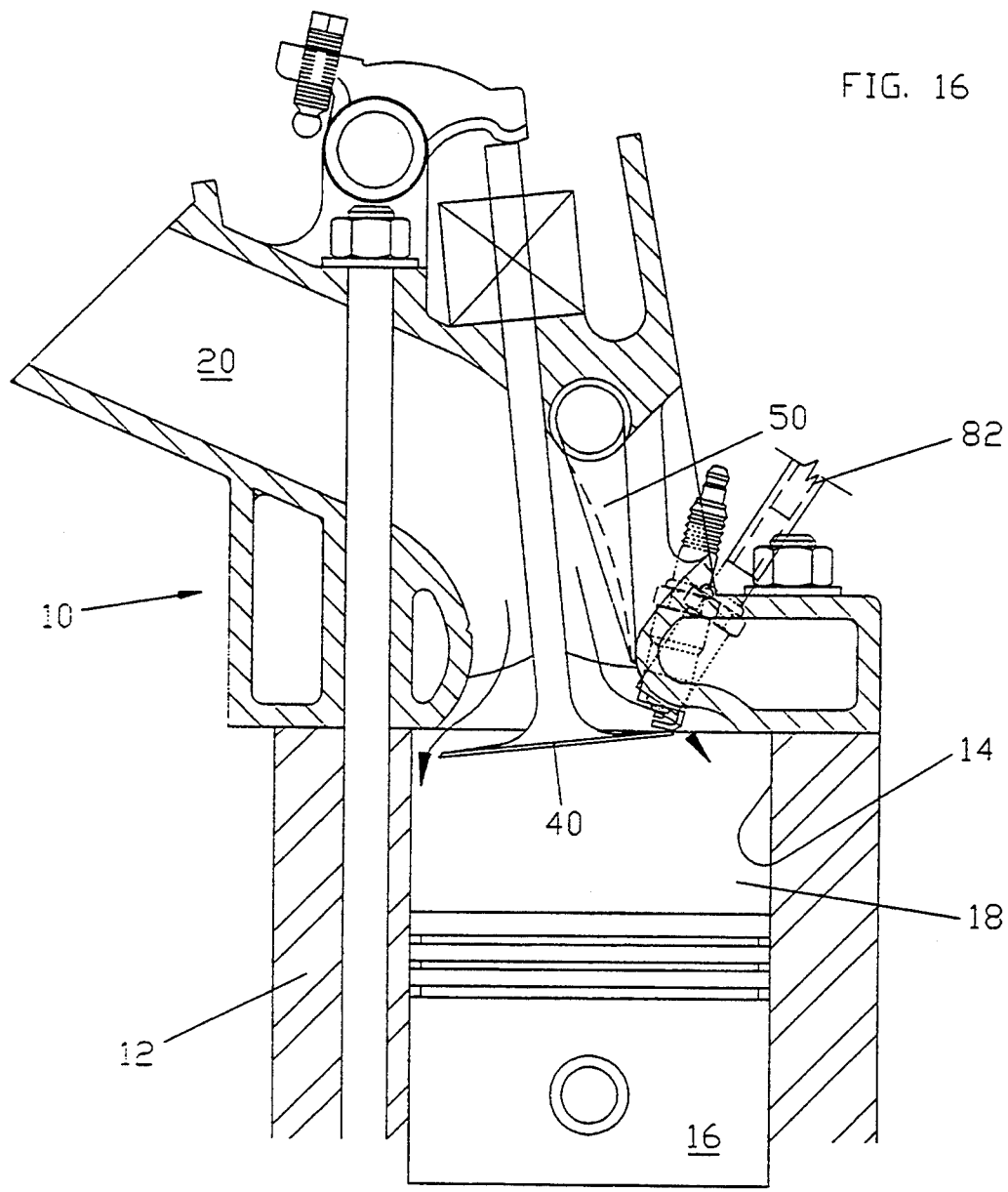
FIG. 16 is a cross-sectional side view of a two-cycle engine with the flapper valve located in the supercharging position.

In the operation of a two-cycle internal combustion engine of the present invention, a single or dual intake port 20 may be employed with the same benefits as described with respect to the four-cycle engine. In the two-cycle operation, a fuel injector 82 is preferably employed, as shown in FIG. 14. The fuel injector could be located so that fuel is injected into the dual-function chamber 24 (known as port injection), or it may be located so that fuel is injected directly into the combustion chamber 18 (known as direct injection). If either direct injection or port injection is employed, a supercharging process may also be employed. A two-cycle engine may also operate with a conventional venture aspirated fuel feeding system in which a fuel/air mixture flows through intake port 20, as described above. For purposes of describing the present invention in a two-cycle operation, only direct injection is illustrated in FIGS. 14-16.

Figure 17:
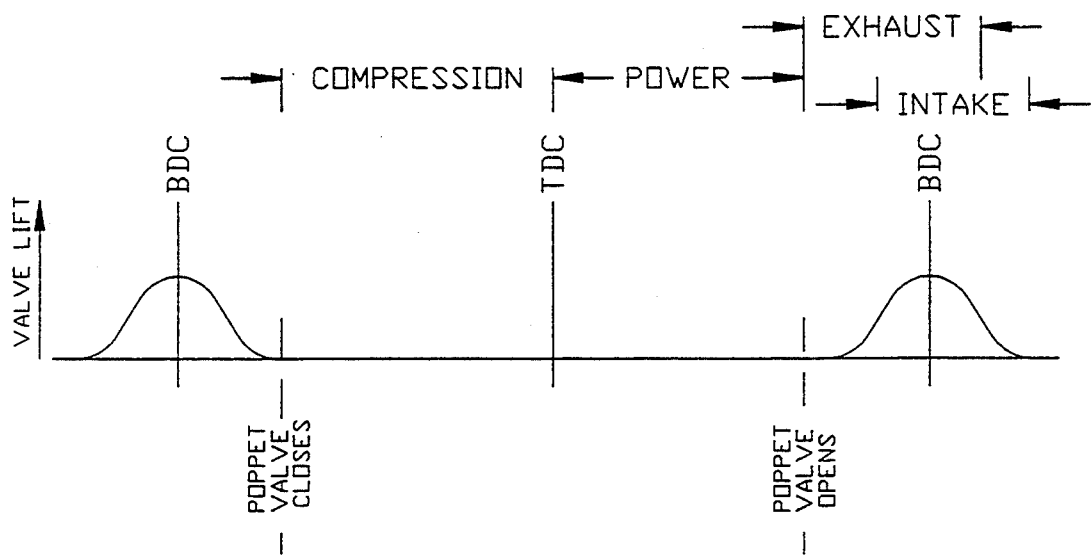
FIG. 17 is a graph showing the position of the poppet valve during the two-cycle operation of an internal combustion engine.
Figure 18:
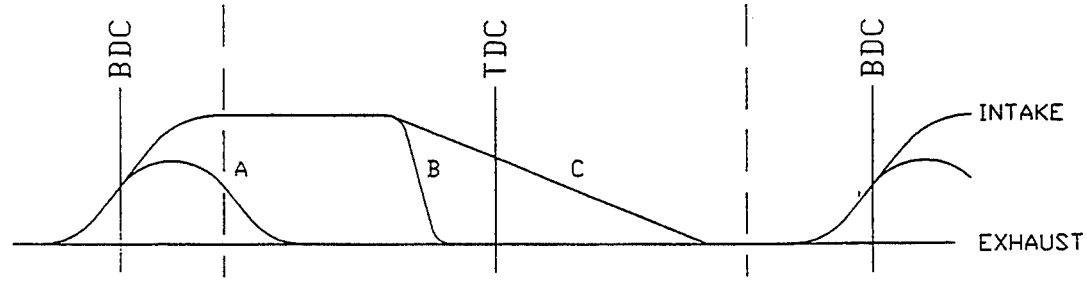
FIG. 18 is a graph showing the position of the flapper valve during the two-cycle operation of an internal combustion engine.

In describing the operation of a two-cycle engine, the graphical illustration of the piston locations, and the positions of the flapper valve 50 and poppet valve 40 are shown in FIGS. 17 and 18. When piston 16 is at the top dead center position, a compressed fuel/air mixture is present within the combustion chamber 18. The poppet valve 40 is closed and the flapper valve 50 can be positioned anywhere. The spark plug ignites the compressed fuel/air mixture causing it to burn and expand, thus driving the piston 16 downward. At the end of the power stroke, when the fuel has substantially burned, the poppet valve 40 opens and the flapper valve 50 must now be adjacent the intake port 20, as shown in FIG. 14 and graphically illustrated in FIGS. 17 and 18. The burned fuel/air mixture, still under compression, exhausts through the dual-function chamber 24, to the exhaust port 30. Shortly after the poppet valve 40 opens to exhaust the combustion chamber, the flapper valve 50 opens to a position between the intake port 20 and the exhaust port 30 allowing air in the intake port to sweep out or scavenge the combustion chamber as is illustrated in FIG. 15.

Shortly before the piston 16 reaches bottom dead center, fuel may be injected either into the dual-function chamber 24 (and carried by the air into the combustion chamber 18), or directly injected into the combustion chamber 18, preferably about the time the poppet valve closes.

Shortly after the piston 16 achieves BDC position, the poppet valve 40 closes and the fuel/air mixture within the combustion chamber 18 compresses with the upward stroke of the piston 16, as graphically illustrated in FIG. 17. With direct injection, it is possible that the fuel can be injected at BDC or slightly after piston 16 begins its upward stroke. It is only necessary that the injector 82 be capable of injecting fuel into a low pressurized environment. As the piston 16 moves upwardly, compressing the fuel/air mixture, it is only necessary for the flapper valve 50 to be in the closed position, i.e., adjacent the intake port 20, before the exhaust cycle begins, as graphically illustrated in FIG. 18. Once the piston 16 reaches TDC, the spark plug ignites the compressed fuel/air mixture and the entire process repeats itself.

Where a conventional venturi aspirated fuel system is employed, the position of the flapper valve 50 after initial opening, follows curve A when closing, i.e., it closes shortly after the poppet valve 40 closes, as graphically illustrated in FIGS. 17 and 18. In such a system, it is only necessary to open the flapper valve 50 to an intermediate position between the intake port 20 and the exhaust port 30 to aid in scavenging the exhaust gasses out the combustion chamber with the fuel/air mixture. As soon as the poppet valve 40 closes, the flapper valve returns to the intake port, as stated above, to stop the fuel/air mixture flowing from the intake port to the exhaust port. Thus, with a conventional aspirated fuel system, it is only necessary to have a valve seat 42 around the intake port.

When direct injection is employed, both the two-cycle and four-cycle engine can be operated in a supercharge process. For the four-cycle engine, supercharging yields an increase in power, as is known by those familiar with the process. However, operating the cylinder head of the present invention on a two-cycle engine with supercharging yields unexpected benefits.

In operation of a two-cycle supercharging process, the poppet valve 40 is initially closed at the start of the power phase. The flapper valve 50 is preferably in an intermediate position between the intake port and the exhaust port, i.e., position C graphically illustrated in FIG. 18. This permits pressurized air to flow from the intake port 20 to the exhaust port 30 across the top of poppet valve 40, cooling it. This occurs just as the spark plug 48 ignites the supercharged fuel/air mixture in the combustion chamber 18, generating heat. As the piston 16 proceeds downwardly due to the fuel expanding as it burns, the flapper valve 50 may gradually be moved adjacent the intake port 20. At the end of the power phase, the poppet valve opens and the flapper valve is positioned as graphically illustrated in FIG. 18. The flapper valve is then moved to a position intermediate the intake port 20 and the exhaust port 30 to allow pressurized air from the intake port to scavenge the exhaust gasses out through exhaust port 30, as illustrated in FIG. 15. The flapper valve 50 is then further opened by positioning it adjacent the exhaust port as illustrated by position E in FIG. 18. From now until the poppet valve closes, as shown in FIG. 17, the combustion chamber is being supercharged with the pressurized air. As soon as the poppet valve closes, and fuel is directly injected into the combustion chamber, the flapper valve may be positioned in an intermediate position to cool the poppet valve 40, as previously explained, or when the engine is cold, the flapper valve may be positioned according to position A in FIG. 18. This position does not allow pressurized air to flow across the poppet valve, allowing it to rise quickly to operating temperature.

Thus it is apparent that there has been provided, in accordance with the invention, a cylinder head for an internal combustion engine that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

That which is claimed:

1. A cylinder head for an internal combustion engine comprising:
   (a) a block forming at least a portion of a combustion chamber;
   (b) a dual-function chamber in said block and communicating with said combustion chamber;
   (c) intake means for passing either a fuel/air mixture or air through said block to said dual-function chamber;
   (d) exhaust means in said block for passing exhaust gases from said dual-function chamber through said block;
   (e) a partition wall centrally located in a portion of said dual-function chamber, said intake means, and said exhaust means;
   (f) first valve means positioned in said portion of a combustion chamber for controlling the fuel/air mixture or air flowing from said dual-function chamber to said combustion chamber and for controlling the exhaust gases flowing from said combustion chamber to said dual-function chamber, said first valve means having a stem extending through said partition wall; and
   (g) second valve means positioned within said dual-function chamber for controlling the flow of the fuel/air mixture or air flowing from said intake means to said dual-function chamber and simultaneously aiding in sweeping out exhaust gases, and for controlling the exhaust gases flowing from said dual-function chamber through said exhaust means, said second valve means designed to have an increased closing force sealing said intake means from said dual-function chamber upon the flow of exhaust gases from the combustion chamber, through said dual-function chamber through said exhaust means.

2. The cylinder head of claim 1, wherein said first valve means includes a poppet valve.

3. The cylinder head of claim 2, wherein said first valve means also includes valve actuation means for actuating said poppet valve.

4. The cylinder head of claim 3, wherein said valve actuation means includes a pivotable rocker arm in contact with said poppet valve, and means to pivot said rocker arm.

5. The cylinder head of claim 1, wherein said second valve means is a dual plate valve means each having one surface only in contact with the fuel/air mixture or air and another surface in contact with the exhaust gasses.

6. The cylinder head of claim 5, wherein said one surface of said plate valve means includes a recessed portion designed to gradually direct the fuel/air mixture or air from said intake means to said dual-function chamber.

7. The cylinder head of claim 1, wherein said intake means comprises dual intake ports.

8. The cylinder head of claim 7, wherein, at least one of said dual intake ports includes a third valve means for controlling the flow of the fuel/air mixture or air through said at least one of said intake ports.

9. The cylinder head of claim 7, wherein said second valve means comprises dual second valve means, said dual second valve means operable to control the fuel/air mixture or air flowing from said dual intake ports to said dual-function chamber and to control exhaust gases from said dual-function chamber to said exhaust means.

10. The cylinder head of claim 9, wherein each of said dual second valve means is independently operable to independently control the fuel/air mixture or air flowing through said dual intake ports.

11. The cylinder head of claim 1, wherein said second valve means when moving from said intake means to said exhaust means, also includes the additional functions of creating a low pressure, thereby encouraging the flow of the fuel/air mixture or air from said intake means to said dual-function chamber, and sweeping the exhaust gases from said dual-function chamber to said exhaust means.

12. The cylinder head of claim 1, wherein said second valve means includes valve seat means positioned in said dual-function chamber.

13. The cylinder head of claim 12, wherein said second valve means includes peripheral sealing means and said valve seat means along with said peripheral sealing means permits said second valve means to initially move while still effectively sealing said intake means or said exhaust means.

14. The cylinder head of claim 1, further comprising a fuel injector positioned so that fuel is injected into said dual-function chamber.

15. The cylinder head of claim 1, further comprising a fuel injector positioned so that fuel is injected directly beneath said first valve means into the combustion chamber.

16. The cylinder head of claim 7, wherein, at lest one of said dual intake ports includes a rotatable valve means for controlling the flow of the fuel/air mixture or air through said at least one of said intake ports

* * * * *